(12) United States Patent
Nagabhushana et al.

(10) Patent No.: US 7,556,676 B2
(45) Date of Patent: Jul. 7, 2009

(54) COMPOSITE OXYGEN ION TRANSPORT MEMBRANE

(75) Inventors: Nagendra Nagabhushana, Williamsville, NY (US); Jonathan Andrew Lane, Amherst, NY (US); Gervase Maxwell Christie, Buffalo, NY (US); Bart Antonie van Hassel, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 526 days.

(21) Appl. No.: 11/507,486

(22) Filed: Aug. 22, 2006

(65) Prior Publication Data

US 2008/0047431 A1      Feb. 28, 2008

(51) Int. Cl.
      *B01D 53/22*      (2006.01)
(52) U.S. Cl. ........................... 96/11; 96/4; 95/54
(58) Field of Classification Search .............. 95/45, 95/54; 96/4, 7, 11; 502/4; 429/19, 33
      See application file for complete search history.

(56) References Cited

U.S. PATENT DOCUMENTS

| | | | |
|---|---|---|---|
| 5,240,480 A | 8/1993 | Thorogood et al. | 96/4 |
| 5,306,411 A | 4/1994 | Mazanec et al. | 204/265 |
| 5,569,633 A * | 10/1996 | Carolan et al. | 95/54 |
| 5,702,999 A * | 12/1997 | Mazanec et al. | 95/54 |
| 5,714,091 A | 2/1998 | Mazanec et al. | 252/373 |
| 5,747,184 A | 5/1998 | Kurbjuhn et al. | |
| 5,817,597 A * | 10/1998 | Carolan et al. | 95/54 |
| 5,958,304 A | 9/1999 | Khandkar et al. | 252/519.15 |
| 6,056,807 A * | 5/2000 | Carolan et al. | 96/4 |
| 6,332,968 B1 * | 12/2001 | Mazanec et al. | 205/334 |
| 6,488,739 B1 | 12/2002 | Mazanec et al. | 95/54 |

(Continued)

FOREIGN PATENT DOCUMENTS

EP      0 438 902 A2      7/1991

(Continued)

OTHER PUBLICATIONS

Vlajic, M. D., et al., "Synthesis, Sintering and Properties of Doped LaSrCrO3", Database accession No. E2003037326893 Abstract and Materials Science Forum, 2002, vol. 413, pp. 121-128.

(Continued)

*Primary Examiner*—Jason M Greene
(74) *Attorney, Agent, or Firm*—David M. Rosenblum

(57) ABSTRACT

A composite oxygen ion transport membrane having a dense layer, a porous support layer, an optional intermediate porous layer located between the porous support layer and the dense layer and an optional surface exchange layer, overlying the dense layer. The dense layer has electronic and ionic phases. The ionic phase is composed of scandia doped, yttrium or cerium stabilized zirconia. The electronic phase is composed of a metallic oxide containing lanthanum, strontium, chromium, manganese and vanadium and optionally cerium. The porous support layer is composed of zirconia partially stabilized with yttrium, scandium, aluminum or cerium or mixtures thereof. The intermediate porous layer, if used, contains the same ionic and electronic phases as the dense layer. The surface exchange layer is formed of an electronic phase of a metallic oxide of lanthanum and strontium that also contains either manganese or iron and an ionic phase of scandia doped zirconia stabilized with yttrium or cerium.

10 Claims, 1 Drawing Sheet

U.S. PATENT DOCUMENTS

| | | | |
|---|---|---|---|
| 6,537,465 B2 * | 3/2003 | Gottzmann et al. | 95/54 |
| 6,537,514 B1 * | 3/2003 | Prasad et al. | 423/437.1 |
| 6,539,719 B2 * | 4/2003 | Prasad et al. | 95/54 |
| 6,544,404 B1 * | 4/2003 | Mazanec et al. | 95/54 |
| 6,565,632 B1 * | 5/2003 | van Hassel et al. | 95/54 |
| 6,730,808 B2 * | 5/2004 | Bitterlich et al. | 502/4 |
| 6,786,952 B1 * | 9/2004 | Risdal et al. | 95/54 |
| 7,332,108 B2 * | 2/2008 | Chartier et al. | 429/33 |

FOREIGN PATENT DOCUMENTS

| | | |
|---|---|---|
| EP | 399833 | 1/1996 |
| EP | 1 202 370 A1 | 5/2002 |

OTHER PUBLICATIONS

Zhenwei Wang et al., "Anode-supported SOFC with 1Ce10ScZr Modified Cathode/Electrolyte Interface", Journal of Power Sources 156, 2006, pp. 306-310.

* cited by examiner

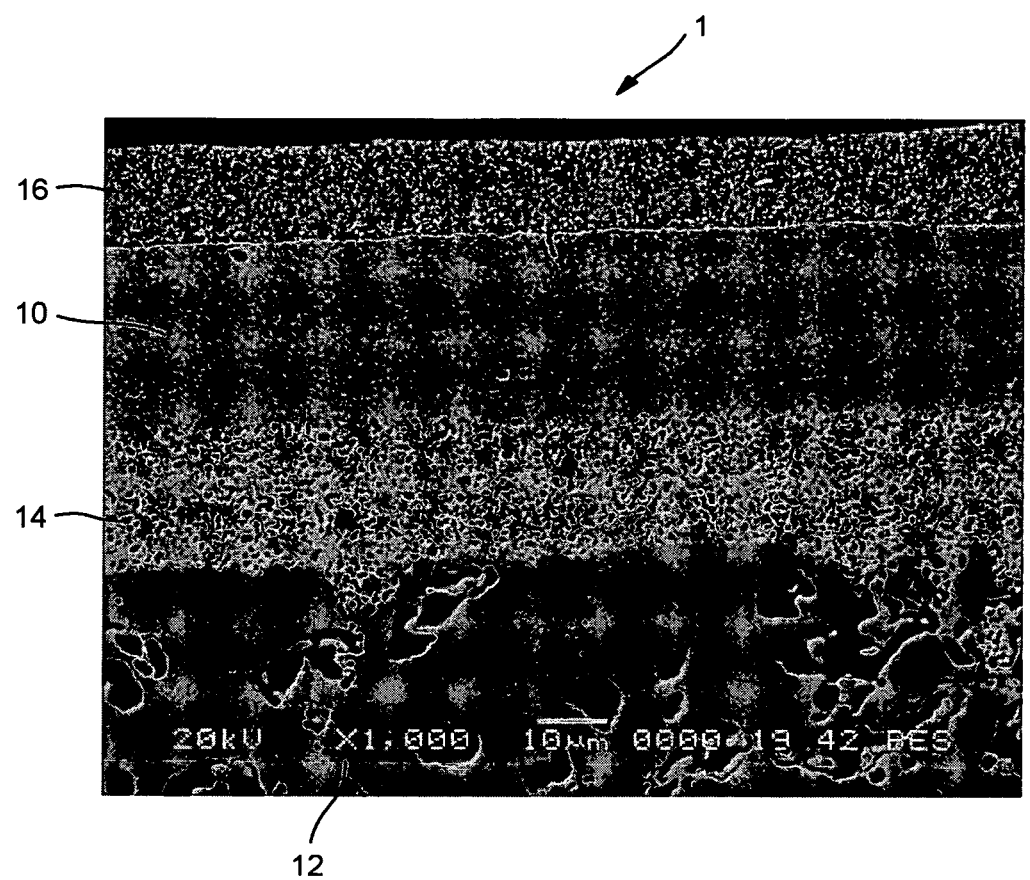
FIG.

COMPOSITE OXYGEN ION TRANSPORT MEMBRANE

FIELD OF THE INVENTION

The present invention relates to a composite oxygen ion transport membrane in which a dense layer having electronic and ionic conducting phases is supported on a porous support layer. More particularly, the present invention relates to such a composite oxygen ion transport membrane in which the electronic phase is a vanadium containing perovskite-like metallic oxide, the ionic phase is a stabilized zirconia and the porous support layer is formed of a partially stabilized zirconia.

BACKGROUND OF THE INVENTION

Composite oxygen ion transport membranes have been proposed for a variety of uses that involve the production of essentially pure oxygen by separation of oxygen from an oxygen containing feed through oxygen ion transport through such membrane. For example, each membrane can be used in combustion devices to support oxy-fuel combustion or for partial oxidation reactions involving the production of a synthesis gases.

In such membranes, the oxygen ion transport principally occurs within a dense layer that allows both oxygen ions and electronic transport at elevated temperatures. The oxygen from an oxygen containing feed ionizes on one surface of the membrane and the resultant oxygen ions are driven through the dense layer and emerge on the opposite side thereof to recombine into elemental oxygen. In the recombination, electrons are liberated and are transported back through the membrane to ionize the oxygen.

Such membranes can employ two phases, an ionic phase to conduct the oxygen ions and an electronic phase to conduct the electrons. In order to minimize the resistance of the membrane to the ionic transport, such membranes are made as thin as practical and are supported on porous support layers. The resulting composite oxygen transport membrane can be fabricated as a planar element or as a tube in which the dense layer is situated either on the inside or the outside of the tube.

An example of a composite oxygen ion transport membrane is disclosed in U.S. Pat. No. 5,240,480 that has a dense layer supported on two porous layers. The dense layer can be formed of an ionic conducting phase that contains yttrium stabilized zirconia and an electronic conducting phase that is formed from platinum or another noble metal. The porous layer adjacent to the dense layer is active and is capable of conducting oxygen ions and electrons. The other porous layer can be yttrium stabilized zirconia or calcium-stabilized zirconia.

U.S. Pat. No. 5,478,444 discloses a two-phase material capable of transporting oxygen ions and electrons. The oxygen ion conducting phase can be a metallic cerium oxide incorporating a yttrium stabilizer and a dopant that can be iron or cobalt. The electronic conducting phase can be a perovskite that contains lanthanum, strontium, magnesium and cobalt or lanthanum, strontium cobalt and iron.

U.S. Pat. No. 5,306,411 discloses a dual-phase membrane having an ionic conducting phase formed from $Sc_2O_3$-stabilized zirconia. The electronically conducting phase can be a perovskite material containing, for example lanthanum strontium, iron, chromium and vanadium. The resultant dense layer can be supported on atria-stabilized zirconia.

The problem that exists with all composite oxygen ion transport membranes is one of strength and durability. This problem arises in part due to the high temperatures that occur when such membranes are used in connection with oxygen-fuel combustion and in reactors. Since the dense layer is very thin it must be supported. As a result, there must be a close match between the thermal expansion of the dense layer, its porous support and any intermediate active porous layer. Additionally, a further problem exists when such membranes are subjected to high oxygen partial pressures. High oxygen partial pressures are produced in combustion devices because as soon as the oxygen emerges from the membrane, it is consumed by reaction with the fuel. This results in chemical expansion due to the high reducing environment. Additionally, perovskites, when used as supports, are particularly susceptible to a phenomenon known as "creep" in which the material will fail under prolonged thermal and mechanical stresses.

As will be discussed, the present invention provides a composite oxygen ion transport membrane element that is more robust than the prior art composite membranes discussed above and that is particularly suitable to environments of high temperature and chemical expansion.

SUMMARY OF THE INVENTION

The present invention provides a composite oxygen ion transport membrane comprising a dense layer having an electronic phase and an ionic phase. As used herein and in the claims, the term "dense" layer means a layer in which the ceramic layer has no connected through porosity.

In accordance with the present invention, the electronic phase is $(La_u Sr_v Ce_{1-u-v})_w Cr_x Mn_y V_z O_{3-\delta}$ where u is from about 0.7 to about 0.9, v is from about 0.1 to about 0.3 and $(1-u-v)$ is greater than or equal to zero, w is from about 0.94 to about 1, x is from about 0.67 to about 0.77, y is from about 0.2 to about 0.3, z is from about 0.015 to about 0.03, and $x+y+z=1$. The ionic phase is $Zr_{x'} Sc_{y'} A_{z'} O_{2-\delta}$, where y' is from about 0.08 to about 0.15, z' is from about 0.01 to about 0.03, $x'+y'+z'=1$ and A is Y or Ce or mixtures of Y and Ce.

The dense layer is supported by a porous support layer. The porous support layer is formed of $Zr_{x''} A_{y''} O_{2-\delta}$, where y" is from about 0.03 to about 0.05, $x''+y''=1$, A is Y or Sc or Al or Ce or mixtures of Y, Sc, Al and Ce.

There are many advantages of the materials used in the present invention over the prior art. A principal advantage of the present invention is that all materials have a very close thermal expansion match in that they all possess a very low linear expansion. Furthermore, all materials have limited chemical expansion and this is particularly important for the perovskite chosen for the electronic phase of the dense layer. In this regard, the use of such perovskite is particularly advantageous as opposed to a metal in that a noble metal would have to be used to prevent oxidation. The obvious problem with the use of a noble metal is one of expense. At the same time, the vanadium containing perovskite is a particularly difficult material to sinter. However, as will be discussed below, the inventors herein have solved such problem allowing its use in the oxygen transport membrane. Furthermore, the support is particularly robust due to the use of partially stabilized zirconia.

A porous intermediate layer can be provided between the dense layer and the porous support layer. Such porous intermediate layer can be composed of the electronic phase and the ionic phase of the dense layer. Furthermore, a surface exchange layer, overlying the dense layer can be provided so that the dense layer is located between the surface exchange layer and the porous intermediate layer. The surface exchange layer can incorporate a further electronic conductor composed of $(La_{x'''}Sr_{1-x'''})_{y'''}MO_{3-\delta}$, where x''' is from about 0.2 to about 0.8, y''' is from about 0.95 to 1, M=Mn, Fe and a further ionic conductor composed of $Zr_{x}^{iv}Sc_{y}^{iv}A_{z}^{iv}O_{2-\delta}$, where $y^{iv}$ is from about 0.08 to about 0.15, $z^{iv}$ is from about 0.01 to about 0.03, $x^{iv}+y^{iv}+z^{iv}=1$ and A=Y, Ce.

Preferably, the ionic phase constitutes between about 35 percent and 65 percent by volume of each of the dense layer and the intermediate porous layer, remainder the electronic phase and the further ionic conductor constitutes between about 35 percent and about 65 percent by volume of the surface exchange layer, remainder the further electronic conductor. Preferably, the ionic phase constitutes about 50 percent by volume of each of the dense layer and the intermediate porous layer, remainder the electronic phase and the further ionic conductor constitutes between about 50 percent by volume of the surface exchange layer, remainder the electronic conductor.

Preferably, in the dense layer, the electronic phase is $(La_{0.825}Sr_{0.175})_{0.97}Cr_{0.76}Mn_{0.225}V_{0.015}O_{3-\delta}$ and the ionic phase is $Zr_{0.89}Sc_{0.1}Y_{0.01}O_{2-\delta}$. The porous support layer is preferably formed of $Zr_{0.97}Y_{0.03}O_{2-\delta}$. In the surface exchange layer, if used, the further ionic conductor is $Zr_{0.89}Sc_{0.1}Y_{0.01}O_{2-\delta}$ and the further electronic conductor is $La_{0.8}Sr_{0.2}FeO_{3-\delta}$. In a particularly preferred embodiment of the present invention, the porous intermediate layer has a first thickness of between about 20 micron and about 60 micron, a first average pore size of between about 0.1 micron and about 0.5 micron and a first porosity of between about 40 percent and about 60 percent. In such embodiment, the porous support layer can preferably have a second thickness of between about 1 mm and about 2.5 mm, a second average pore size of between about 2 micron and about 5 micron and a second porosity of between about 40 percent and about 60 percent. The overlying porous support layer can have a third thickness of between about 10 micron and about 25 micron, a third average pore size of between about 0.1 micron and about 0.5 micron and a third porosity of between about 40 percent and about 60 percent.

It is to be noted, that as used herein and in the claims, the term "pore size" means average pore diameter as determined by quantitative stereological line intersection analysis, a technique well known in the art.

BRIEF DESCRIPTION OF THE DRAWING

While the specification concludes with claims distinctly pointing out the subject matter that Applicants regard as their invention, it is believed that the invention would be better understood when taken in connection with the accompanying drawing in which the sole FIGURE is a scanning electron micrograph of a composite oxygen ion transport membrane of the present invention.

DETAILED DESCRIPTION

With reference to the sole FIGURE an oxygen ion transport membrane 1 of the present invention is illustrated. Oxygen ion transport membrane 1 has a dense layer 10 supported on a porous support 12. Optional intermediate porous layer 14 and a surface exchange layer 16 can be provided.

Dense layer 10 functions to separate oxygen from an oxygen containing feed exposed to one surface of the oxygen ion transport membrane 10 and contains an electronic and ionic conducting phases. As discussed above, the electronic phase of $(La_{u}Sr_{v}Ce_{1-u-v})_{w}Cr_{x}Mn_{y}V_{z}O_{3-\delta}$, where u is from about 0.7 to about 0.9, v is from about 0.1 to about 0.3 and (1-u-v) is greater than or equal to zero, w is from about 0.94 to about 1, x is from about 0.67 to about 0.77, y is from about 0.2 to about 0.3, z is from about 0.015 to about 0.03, and x+y+z=1. The ionic phase is $Zr_{x'}Sc_{y'}A_{z'}O_{2-\delta}$, where y' is from about 0.08 to about 0.15, z' is from about 0.01 to about 0.03, x'+y'+z'=1 and A is Y or Ce or mixtures of Y and Ce. It is to be noted, that since the quantity (1-u-v) can be equal to zero, cerium may not be present within an electronic phase of the present invention.

The porous support layer 12 is formed of $Zr_{x''}A_{y''}O_{2-\delta}$, where y'' is from about 0.03 to about 0.05, x''+y''=1, A is Y or Sc or Al or Ce or mixtures of Y, Sc, Al and Ce.

Oxygen ion transport membrane 1 is specifically designed to be used in connection with oxy-fuel combustion applications as well as applications involving chemical reactions. The application of the present invention is not, however, limited to such uses. However, where the application involves fuel combustion, the use of intermediate porous layer 14 enhances the rate of fuel oxidation at that interface by providing a high surface area where fuel can react with oxygen or oxygen ions under the formation of partial or complete oxidation products. The oxygen ions diffuse through the mixed conducting matrix of this porous layer towards the porous support 12 and react with the fuel that diffuses inward from the porous support 12 into this porous intermediate layer 14. Preferably, porous intermediate layer 14 is formed from the same electronic and ionic phases as dense layer 10.

Any embodiment of the present invention can advantageously incorporate a surface exchange layer 16 that overlies the dense layer opposite to the porous intermediate layer if the same is used. Surface exchange layer 16 enhances the surface exchange rate by enhancing the surface area of the dense layer 10 while providing a path for the resulting oxygen ions to diffuse through the mixed conducting oxide phase to the dense layer 10 and for oxygen molecules to diffuse through the open pore space to the same. The surface exchange layer 16 therefore, reduces the loss of driving force in the surface exchange process and thereby increases the achievable oxygen flux. As indicated above, it also can be a two-phase mixture containing an electronic conductor composed of $(La_{x'''}Sr_{1-x'''})_{y'''}MO_{3-\delta}$, where x''' is from about 0.2 to about 0.8, y''' is from about 0.95 to 1, M=Mn, Fe and an ionic conductor composed of $Zr_{x}^{iv}Sc_{y}^{iv}A_{z}^{iv}O_{2-\delta}$, where $y^{iv}$ is from about 0.08 to about 0.15, $z^{iv}$ is from about 0.01 to about 0.03, $x^{iv}+y^{iv}+z^{iv}=1$ and A=Y, Ce.

In a particularly preferred embodiment of the present invention, the dense layer 10 incorporates an electronic phase composed of $(La_{0.825}Sr_{0.175})_{0.97}Cr_{0.76}Mn_{0.225}V_{0.015}O_{3-\delta}$ and an ionic phase composed of $Zr_{0.89}Sc_{0.1}Y_{0.01}O_{2-\delta}$. In such embodiment, the porous support layer 12 is formed of $Zr_{0.97}Y_{0.03}O_{2-\delta}$ and the surface exchange layer incorporates an ionic conductor composed of $Zr_{0.89}Sc_{0.1}Y_{0.01}O_{2-\delta}$ and an electronic conductor composed of $La_{0.8}Sr_{0.2}FeO_{3-\delta}$. Preferably, the porous intermediate layer 14 has a thickness of between about 20 micron and about 60 micron, an average pore size of between about 0.1 microns and about 0.5 microns and a first porosity of between about 40 percent and about 60 percent. Porous support layer 12 has a thickness of between about 1 mm and about 2.5 mm, an average pore size of between about 2 micron and about 5 micron and a porosity of between about 40 percent and about 60 percent. The surface exchange layer 16 has a thickness of between about 10 microns and about 25 microns, an average pore size of between about 0.1 microns and about 0.5 microns and a porosity of between about 40 percent and about 60 percent.

As an example of fabricating an oxygen transport membrane element of the present invention, a porous support layer 12 is first fabricated from spray granulated yttrium stabilized zirconia powder having a chemical formula of $Zr_{0.97}Y_{0.03}O_{2-\delta}$ (hereinafter, "YSZ Powder".) The particle size of such powder is d50=0.6 µm (about a 50 percentile of the particles have a particle size of below 0.6 µm.) The powder is then wet mixed with glassy carbon having a particle size of a d50 of from about 0.4 to about 12 µm and starch having a particle size of a d50 of about 34 µm. The mixture contains about 10 percent glassy carbon, 15 percent starch and a remainder of the yttrium stabilized zirconia powder. It is desirable that the oxygen transport membrane element be non-porous at the ends for sealing purposes. As such, the YSZ Powder is mixed with a binder such as PVB (Poly Vinyl Butyrl) that can be obtained from Sigma-Aldrich, 3050 Spruce Street, St. Louis, Mo. 63103 and then poured into an isopressing mold. The isopressing mold can be a 20 mm thick flexible tube having an inner diameter of about 24.75 mm and an internal 17.75 mm diameter mandrel. Thereafter, the mixture of YSZ Powder, carbon starch and the binder is poured into the mold and a further amount of the mixture of YSZ Powder and binder alone is then poured into the mold. As a result, the ends of the support layer 12 will be non-porous and a central section will be porous.

The mold is then subjected to a hydrostatic pressure of about 20 ksi to form a green tube. After the green tube is formed, the tube can then be fired at 1000° C. for 4 hours to achieve reasonable strength for further handling. After firing, the resulting tube can be checked for porosity, permeability/tortuosity and stored in a dry oven at about 60° C.

After forming the green tube, intermediate porous layer 14 is then formed. A mixture of about 34 grams of powders having electronic and ionic phases and the chemical formulas, $(La_{0.825}Sr_{0.175})_{0.97}Cr_{0.76}Mn_{0.225}V_{0.015}O_{3-\delta}$ ("LSCMV") and $Zr_{0.89}Sc_{0.1}Y_{0.01}O_{2-\delta}$ ("YScZ"), respectively, is prepared so that the mixture contains equal proportions by volume of LSCMV and YScZ. To the mixture, 100 grams of toluene, 20 grams of the binder of the type mentioned above, 400 grams of 1.5 mm diameter YSZ grinding media are added. The mixture is then milled for about 6 hours to form a slurry ($d_{50}$ of about 0.34 µm). About 6 grams of carbon black having a particle size of about d50=0.8 µm is then added to the slurry and milled for additional 2 hours. An additional 10 grams of toluene and about 10 grams of additional binder were added to the slurry and mixed for between about 1.5 and about 2 hours. The inner wall of the green tube formed above is then coated by pouring the slurry, holding once for 5 seconds and pouring out the residual back to the bottle. The coated green tube is then dried and fired at 850° C. for 1 hour in air for binder burnout.

The dense layer 10 is then applied. A mixture weighing about 40 grams is prepared that contains the same powders as used in forming the intermediate porous layer 14, discussed above, except that the ratio between LSCMV and YScZ is about 40/60 by volume, 2.4 grams of cobalt nitrate {Co(NO$_3$)$_2$.6H$_2$O}, 95 grams of toluene, 5 grams of ethanol, 20 grams of the binder identified above, 400 grams of 1.5 mm diameter YSZ grinding media are then added to the mixture and the same is milled for about 10 hours to form a slurry ($d_{50}$~0.34 µm). Again, about 10 grams of toluene and about 10 grams of binder are added to the slurry and mixed for about 1.5 and about 2 hours. The inner wall of the tube is then coated by pouring the slurry, holding once for 10 seconds and pouring out the residual back to the bottle. The tube is then stored dry prior to firing the layers in a controlled environment.

The coated green tube is then placed on a C-setter in a horizontal tube furnace and porous alumina tubes impregnated with chromium nitrate are placed close to the coated tube to saturate the environment with chromium vapor. The tubes are heated in static air to about 800° C. for binder burnout and the environment is switched to an atmosphere of a saturated nitrogen mixture (nitrogen and water vapor) that contains about 4 percent by volume of hydrogen to allow the vanadium containing electronic conducting perovskites to properly sinter. The tube is held at 1400° C. for 8 hours and then cooled in nitrogen to complete the sintering of the materials. The sintered tube is checked for helium leak rates that should be lower than $10^{-7}$ Pa.

Surface exchange layer 16 is then applied. A mixture of powders is prepared that contains about 35 of equal amounts of ionic and electronic phases having chemical formulas of $Zr_{0.89}Sc_{0.1}Y_{0.01}O_{2-\delta}$ and $La_{0.8}Sr_{0.2}FeO_{3-\delta}$, respectively. To this mixture, about 100 grams of toluene, 20 grams of the binder identified above, about 400 grams of 1.5 mm diameter YSZ grinding media are added and the resultant mixture is milled for about 14 hours to form a slurry ($d_{50}$~0.4 µm). About six grams of carbon black are added to the slurry and milled for additional 2 hours. A mixture of about 10 grams of toluene and about 10 grams of the binder are then added to the slurry and mixed for between about 1.5 and about 2 hours. The inner wall of the tube is then coated by pouring the slurry, holding twice for about 10 seconds and then pouring out the residual back to the bottle. The coated tube is then dried and fired at 1100° C. for two hours in air.

The resultant tubes have the preferred thickness, pore size and porosity within the ranges outlined above, namely, the porous intermediate layer 14 has a thickness of about 25 microns, an average pore size of between about 0.1 to about 0.5 microns and a porosity of between about 40 percent and about 60 percent. Porous support layer 12 has a thickness of about 2.1 mm, an average pore size of between about 2 and about 5 microns and a porosity of about 45 percent. The surface exchange layer 16 has a thickness of about 14 microns, an average pore size of between about 0.1 and about 0.5 microns and a porosity of between about 40 percent and about 60 percent. Such tubes have been found to be able to withstand operational cycles involving cool down to a temperature of about 25° C. and heating to a temperature of about 1000° C. of 20-40 cycles over 1512 hours of operation.

It is to be noted that in any embodiment of the present invention, the particle size of the chromite/zirconia slurry for deposition of the intermediate and dense separation layers 14 and 10 should be in a range of between about 0.3 and about 0.35 µm. Membranes fabricated from such slurries indicated minimal reactivity between the two phases and with shrinkage matching the porous zirconia support.

Cobalt nitrate is preferably utilized as a sintering aid to the densification of the dense layer 10. Preferably, the porous alumina tubes have a pore size of about 0.5 mm and a porosity of about 60 percent, a diameter of about 12.75 mm, and a thickness of about 2 mm. Each of the alumina tubes contains about 10 percent by weight of chromium nitrate.

While the invention has been described with respect to a preferred embodiment, as will occur to those skilled in the art, numerous changes, additions and omissions may be made without departing from the spirit and scope of the present invention provided for in the appended claims.

We claim:

1. A composite oxygen ion transport membrane comprising:
   a dense layer having an electronic phase and an ionic phase;
   said electronic phase is $(La_uSr_vCe_{1-u-v})_wCr_xMn_yV_zO_{3-\delta}$, where u is from about 0.7 to about 0.9, v is from about 0.1 to about 0.3 and (1−u−v) is greater than or equal to zero, w is from about 0.94 to about 1, x is from about 0.67 to about 0.77, y is from about 0.2 to about 0.3, z is from about 0.015 to about 0.03, and x+y+z=1;

said ionic phase is $Zr_{x'}Sc_{y'}A_{z'}O_{2-\delta}$, where y' is from about 0.08 to about 0.15, z' is from about 0.01 to about 0.03, x'+y'+z'=1 and A is Y or Ce or mixtures of Y and Ce;

a porous support layer, said porous support layer formed of $Zr_{x''}A_{y''}O_{2-\delta}$, where y'' is from about 0.03 to about 0.05, x''+y''=1, A is Y or Sc or Al or Ce or mixtures of Y, Sc, Al and Ce.

2. The composite ion transport membrane of claim 1, further comprising:

a porous intermediate layer between the dense layer and the porous support layer; and the porous intermediate layer composed of the electronic phase and the ionic phase.

3. The composite ion transport membrane of claim 2, further comprising:

a surface exchange layer, overlying the dense layer so that the dense layer is located between the surface exchange layer and the porous intermediate layer;

said surface exchange layer composed of a further electronic conductor composed of $(La_{x'''}Sr_{1-x'''})_{y'''}MO_{3-\delta}$, where x''' is from about 0.2 to about 0.8, y''' is from about 0.95 to 1, M=Mn, Fe and a further ionic conductor composed of $Zr_x^{iv}Sc_y^{iv}A_z^{iv}O_{2-\delta}$, where $y^{iv}$ is from about 0.08 to about 0.15, $z^{iv}$ is from about 0.01 to about 0.03, $x^{iv}+y^{iv}+z^{iv}=1$ and A=Y, Ce.

4. The composite ion transport membrane of claim 3, wherein:

the ionic phase constitutes between about 35 percent and 65 percent by volume of each of the dense layer and the intermediate porous layer, remainder the electronic phase; and the further ionic conductor constitutes between about 35 percent and about 65 percent by volume of the surface exchange layer, remainder the further electronic conductor.

5. The composite ion transport membrane of claim 4, wherein:

the ionic phase constitutes about 50 percent by volume of each of the dense layer and the intermediate porous layer, remainder the electronic phase; and the further ionic conductor constitutes between about 50 percent by volume of the surface exchange layer, remainder the electronic conductor.

6. The composite ion transport membrane of claim 1, wherein:

the electronic phase is $(La_{0.825}Sr_{0.175})_{0.97}Cr_{0.76}Mn_{0.225}V_{0.015}O_{3-\delta}$; and the ionic phase is $Zr_{0.89}Sc_{0.1}Y_{0.01}O_{2-\delta}$.

7. The composite ion transport membrane of claim 2, wherein:

the electronic phase is $(La_{0.825}Sr_{0.175})_{0.97}Cr_{0.76}Mn_{0.225}V_{0.015}O_{3-\delta}$; and the ionic phase is $Zr_{0.89}Sc_{0.1}Y_{0.01}O_{2-\delta}$.

8. The composite ion transport membrane of claim 6 or claim 7, wherein said porous support layer is formed of $Zr_{0.97}Y_{0.03}O_{2-\delta}$.

9. The composite ion transport membrane of claim 5, wherein:

the electronic phase is $(La_{0.825}Sr_{0.175})_{0.97}Cr_{0.76}Mn_{0.225}V_{0.015}O_{3-\delta}$; the ionic phase is $Zr_{0.89}Sc_{0.1}Y_{0.01}O_{2-\delta}$;

said porous support layer is formed of $Zr_{0.97}Y_{0.03}O_{2-\delta}$; the further ionic conductor is $Zr_{0.89}Sc_{0.1}Y_{0.01}O_{2-\delta}$; and the further electronic conductor is $La_{0.8}Sr_{0.2}FeO_{3-\delta}$.

10. The composite ion transport membrane of claim 9, wherein:

the porous intermediate layer has a first thickness of between about 20 micron and about 60 micron, a first average pore size of between about 0.1 mic and about 0.5 mic and a first porosity of between about 40 percent and about 60 percent;

the porous support layer has a second thickness of between about 1 mm and about 2.5 mm, a second average pore size of between about 2 micron and about 5 micron and a second porosity of between about 40 percent and about 60 percent; and said overlying porous support layer has a third thickness of between about 10 micron and about 25 micron, a third average pore-size of between about 0.1 micron and about 0.5 micron and a third porosity of between about 40 percent and about 60 percent.

* * * * *

UNITED STATES PATENT AND TRADEMARK OFFICE
CERTIFICATE OF CORRECTION

PATENT NO. : 7,556,676 B2
APPLICATION NO. : 11/507486
DATED : July 7, 2009
INVENTOR(S) : Nagabhushana et al.

Page 1 of 1

It is certified that error appears in the above-identified patent and that said Letters Patent is hereby corrected as shown below:

Column 2, line 31, the equation "$(La_uSr_vCe_{1-u-v})_wCr_xMn_yV_zO_{3-5}$" should appear as follows:

-- $(La_uSr_vCe_{1-u-v})_wCr_xMn_yV_zO_{3-\delta}$ --.

Column 3, line 65, the equation "$(La_uSr_vCe_{1-u-v})_wCr_xMn_yV_zO_{3-5}$" should appear as follows:

-- $(La_uSr_vCe_{1-u-v})_wCr_xMn_yV_zO_{3-\delta}$ --.

Column 6, line 64, the equation "$(La_uSr_vCe_{1-u-v})_wCr_xMn_yV_zO_{3-5}$" should appear as follows:

-- $(La_uSr_vCe_{1-u-v})_wCr_xMn_yV_zO_{3-\delta}$ --.

Signed and Sealed this

Fifth Day of October, 2010

David J. Kappos
*Director of the United States Patent and Trademark Office*